(12) United States Patent
Nieh

(10) Patent No.: US 6,376,588 B1
(45) Date of Patent: Apr. 23, 2002

(54) WATER SOLUBLE MOLD RELEASE COMPOSITION FOR ELASTOMERIC COMPOUNDS

(75) Inventor: Edward Chung Yit Nieh, Austin, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 0 days.

(21) Appl. No.: 07/776,014

(22) Filed: Oct. 15, 1991

(51) Int. Cl.⁷ .................................................. C08K 5/06
(52) U.S. Cl. ........................ 524/377; 524/757; 524/761; 524/762; 568/580; 264/213
(58) Field of Search ................................ 524/377, 757, 524/761, 762; 568/580, 582; 264/213, 338; 252/182.27, 182.29

(56) References Cited

U.S. PATENT DOCUMENTS

| | | | | |
|---|---|---|---|---|
| 2,687,378 A | * | 8/1954 | Goldschmidt et al. | 568/582 |
| 2,786,080 A | * | 3/1957 | Patton, Jr. | 568/582 |
| 3,377,385 A | * | 4/1968 | Turumaru et al. | 568/580 |
| 3,637,865 A | * | 1/1972 | Haring et al. | 568/582 |
| 4,007,230 A | * | 2/1977 | Hinze | 568/582 |
| 4,021,385 A | * | 5/1977 | Austin et al. | 568/582 |
| 4,217,394 A | | 8/1980 | Newkirk et al. | 428/457 |
| 4,277,366 A | * | 7/1981 | Mago | 568/580 |
| 4,555,549 A | | 11/1985 | Camp et al. | 525/409 |
| 4,582,943 A | * | 4/1986 | Kristen et al. | 568/580 |

FOREIGN PATENT DOCUMENTS

EP   0 537 891 A2   8/1992

OTHER PUBLICATIONS

"The Polyglycol Handbook", Dow, 1988.*
Kirk–Othmer, Encyclopedia of Chemical Technology, vol. 18, pp. 623–624 and 637–638, 1982.*

* cited by examiner

Primary Examiner—Edward J. Cain
(74) Attorney, Agent, or Firm—O'Keefe, Egan & Peterman LLP

(57) ABSTRACT

Disclosed is a composition useful as a mold release agent, exhibiting viscosities, lubricities and melting points which cover a wide range and fit a variety of types of molding equipment, comprising:

a) 5 to 40% by weight one or more water soluble copolymers of ethylene oxide and propylene oxide which are in liquid phase at ambient temperatures;

b) 15 to 60% by weight a crystalline polyoxyalkylene having a melting point slightly above ambient; and c) 100 to 5000 ppm of one or more antioxidant additives.

11 Claims, No Drawings

WATER SOLUBLE MOLD RELEASE COMPOSITION FOR ELASTOMERIC COMPOUNDS

FIELD OF THE INVENTION

This invention relates to mandrel release agents. More particularly the invention relates to three component compositions which function as mandrel release agents for processing rubber based elastomers. These compositions combine the more desirable properties traditionally found in liquid lubricants and polyethylene glycol lubricants. They have optimum viscosity at application temperatures and result in immobile films which are smooth without brittleness at ambient temperatures.

In addition, these release agents are stable at rubber curing temperatures, compatible with most natural and synthetic rubber parts, do not cause swelling or shrinkage of parts and provide a lubricating function during demolding. The release agent compositions can be adapted to cover a wide range of viscosities, lubricities and melting points to fit different types of rubber parts and molding equipment.

BACKGROUND OF THE INVENTION

In many areas of plastics and rubber processing release agents are important aids. These release agents are found in the market under different names such as mandrel release agents, mold release agents, antiadhesion promoters, demolding agents, antiadhesives and separating agents. There are fields of applications in which the use of release agents is critical to manufacture certain products and other applications where the agents modify the surface or merely facilitate the work. More detail on the role of such agents is discussed in the Journal Article titled "STATE OF DEVELOPMENT OF RELEASE AGENTS USED IN PLASTICS PROCESSING," Rathje, G., Kunststuffe; *German Plastics*, Vol. 75, No. 2, February 1985, pp. 12–13. Details are given on conventional release agents, separation systems and coating techniques.

An article in a Hungarian journal describes some adhesion preventing agents in the manufacture of rubber products. Due to heat introduced and/or released during molding and vulcanization of rubber products, it is frequent that the molded products adhere to the molds and do some damage to the product at the time of demolding. Different so-called mold lubricants are used to prevent this adhesion and ease the product release. (See Muanyag Es Gumiv Vol. 21, No. 9, September 1984, pp. 271–273).

Another journal article discusses the fast growing market for lubricants in the plastics industry. The variety of the chemical compositions of the plastics to which they are added and the processes that are used in conversion of them coincides with a wide range of effects. See Chemische Industrie International (English Translation), No. 3, 1987, pp. 13, 16–19.

A product bulletin, *The Polyglycol Handbook*, published by Dow Chemical Co., 1988, pp. 22–23, discusses the use of polyethylene glycols in the role of mold release agents and lubricants in the rubber industry.

The Dow bulletin indicates polyethylene glycols can be used in mold release agents for latex foams. A lower molecular weight liquid polyethylene glycol can be used as a mold release agent in the production of articles prepared from latex rubber. In addition, water-soluble liquid polyglycols are used alone, or in combination with higher molecular weight polyglycols as mold and mandrel lubricants in the production of fire hose, rubber hose and shoe heels.

According to *JEFFOX® Polyethylene Glycols*, published by Texaco Chemical Company, 1983, at pages 12–13, several polyethylene glycols in the JEFFOX® product line are useful as mold release agents.

A bulletin titled *Newpol LB Series 50 HB Series 75H Series* (Bulletin No. D105-201-1), published by Sanyo Chemical Industries, October 1976, contains a discussion of that company's product line of polyalkyleneamines and their use as mold release agents.

Japanese Patent J58132090-A discloses compositions for releasing rubber hose from mandrel which are prepared by addition, polymerizing $NH_3$ or amine (e. g. mono-, di- or triethanol amine) with an alkylene oxide such as ethylene oxide and/or propylene oxide.

Conventional releasing agents include polypropylene glycol, polyoxypropylene glycerol ether, polyoxyethylene/polyoxypropylene block copolymer, polyoxypropylene/polyoxyethylene glycerol ether, polyethylene glycol, silicone oil, animal or vegetable oil or mineral oil, Ibid.

In a paper delivered at the Society of the Plastics Industry, Reinforced Plastics/Composite Institute, Annual Conference-Proceedings 43rd, published by SPI, Washington, D.C., USA, 1988, pp. 12A.1–12A.6, James Werner reviewed the benefits of using perfluorinated polyethers as mold release agents in rotational molding of polyethylene and polycarbonate, molding of epoxy resins and graphite fibers, molding of solid propellant rocket fuels and molding of intricate ceramic parts.

A Romanian patent, RO-82386, discloses a mixture which contains by weight 5–60% polyether polymer and/or copolymer of the formula:

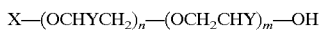

$$X\text{—}(OCHYCH_2)_n\text{—}(OCH_2CHY)_m\text{—}OH$$

where X is H, Me, Et, $C_3H_7$ or $C_4H_9$, Y is H or Me, n and m are integers of from 1–50 and 0.1–5% ionic or nonionic surfactants, such as an alkylaryl sulphonate and sulphated or ethoxylated fatty alcohols, 1–6000 ppm w.r.t. total mixture, corrosion inhibiter specific to the contacting metal and the balance deionized water. The composition can be used as antiadhesive in the production of rubber articles, plastic materials, synthetic resins and in casting concrete.

In U.S. Pat. No. 4,217,394 there are disclosed mold-release compositions suitable for lubricating metal molds such as the type used in molding natural and synthetic rubber and other polymers. The mold release agents are oxidation stable homopolymers and copolymers, i.e. block or heteric polyoxyalkylene lubricant compounds. The lubricants can be used alone or in mixtures with polyoxyalkylene lubricant compounds known in the art. Where polyalkylene glycols are used in the art as mandrel or mold release agents the applications for each are usually limited-because of the narrow range of viscosity, lubricity and melting points which are suitable for each type of polyethylene glycol.

In the art relating to release agents, traditionally liquid lubricants and polyethylene glycol lubricants have been useful, although some undesirable properties are characteristic of each.

Liquid lubricants are usually diluted and the amount of dilution controls the viscosity of the film in the mold. Generally, the viscosities of the films tend to be higher, but they are still in a liquid state.

Alternatively, polyethylene glycols can be used as mold release agents. These compounds are used in solid form. They are applied in molten form and are often of a thin viscosity at application temperatures. As these agents cool on the molded parts they leave a solid film that is brittle.

With articles such as rubber hoses, elastomeric parts or flexible parts a solid film exhibiting brittleness will flake off.

There is a need in the art for a release agent which represents a combination of the more desirable properties of both liquid lubricants and polyethylene glycol lubricants. It would represent a distinct advance in the art if a release agent were formulated which had the most desirable viscosity at application temperatures and resulted in a solid film which was smooth but exhibited no brittleness or cracking.

A release agent composition which could be adjusted to cover a wide range of viscosities, lubricities and melting points and was adaptable to fit a number of different types of molding equipment would resolve many of the problems commonly associated with work in the field of molding rubber and plastic.

It would be especially valuable in the art to define a release agent composition possessing these desirable characteristics wherein the melting point of the formula could be precisely controlled by one of the components in the composition.

SUMMARY OF THE INVENTION

In accordance with the foregoing, the instant invention is directed to a three-component water soluble mold release composition for processing rubber based elastomers comprising one or more water soluble copolymers of ethylene oxide and propylene oxide, a highly crystalline polyoxyalkylene compound which melts at slightly above ambient temperatures and one or more antioxidant additives. In the molten state the second component has a relatively low viscosity in comparison with the first component.

DESCRIPTION OF THE PREFERRED EMBODIMENT

The mold release agent of the instant invention for processing rubber based elastomers comprises a composition consisting of:
a) 85 to 40% by weight one or more water soluble copolymers of ethylene oxide and propylene oxide exhibiting liquid phase at ambient temperatures;
b) 20 to 50% by weight of a crystalline polyoxyalkylene glycol having a melting point slightly above ambient; and
c) 100 to 5000 ppm of one or more antioxidant additives.

The invention provides a mandrel or mold release agent with the following advantages over any similar agent known in the art:

1) These novel release agents are compatible with most natural and synthetic rubber parts;
2) They exhibit a very minimal amount of swelling or shrinkage of parts and, in fact are almost free from causing swelling or shrinking of parts;
3) They provide anti-sticking and lubrication function during demolding;
4) They are stable under rubber curing temperatures and they possess high load resistance and excellent shear stability;
5) They cover a wide range of viscosity, lubricity and melting points to fit any given molding equipment;
6) They provide a seasonably adjustable formula by allowing precise control over the melting point;
7) They can be formulated to the same viscosity at processing temperature for very consistent molding and demolding according to the specification of the processing equipment;
8) They can also be formulated to develop different ambient temperature properties which meet the requirements of desirable post molding properties, such as, for example, solidifying to a smooth and thin film without cracking.

The ability to vary the post molding properties assures that the formula can be adjusted to meet a wide range of processing variables such as the type of rubber involved, the size of the parts, the ambient temperature and processing equipment.

In the composition of this invention the first component consists of mixed or blocked copolymers of ethylene oxide and propylene oxide which should preferably contain at least 30% to 80% by weight oxyethylene units.

The polymer can be made by a base catalyzed addition of ethylene oxide and propylene oxide to mono-, di- and tri-functional initiators to a suitable molecular weight. The copolymer can be prepared by reacting an initiator such as diethylene glycol with a mixture of ethylene oxide and propylene oxide. The mixture of copolymers of ethylene oxide and propylene oxide are preferably present in a ratio of from 75:25 to 50:50. The reaction is exothermic, however, and should be controlled by maintaining the reaction temperature between 115° C. and 120° C. The pressure is not critical and the reaction generally takes place at atmospheric pressure to 150 psi pressure.

Several commercially available compositions which exhibit these properties are TEXOX® WL-660, WL-3300 and WL-5000. TEXOX® WL-660, WL-3300 and WL-5000 are water soluble synthetic functional fluids which are derivatives of propylene oxide or propylene oxide and ethylene oxide. The molecular weights of WL-660, -3300 and -5000 are 1800, 2700 and 4365 respectively. The viscosities for WL-660, WL-3300, and WL-5000 are 143 cs, 720 cs and 1200 cs, measured at 100° F. respectively.

The suitable molecular weight for these polymers differs according to the desired viscosity for a given application. In general, the useful viscosity of the liquid polymer component is 400 to 1250 cs measured at 100° F. A suitable viscosity to cover the middle viscosity ranges can be obtained by blending a high viscosity polymer and a low viscosity polymer.

The second component comprises mono- or di- functional initiator derived polyethylene oxide. Such a compound can optionally be made from block copolymers of ethylene oxide and propylene oxide having a sufficiently large block of oxyethylene segments, i.e., >23 units, to achieve the desired crystallinity and melting point. Alternatively, commercial products are available which exhibit the required properties. Suitable products include TEXOX® PEG-850, PEG-900, PEG-950, PEG-1000, and PEG-1050. TEXOX® PEG series products are polyethylene glycols having an approximate molecular weight between 850 and 1050.

As discussed, the third component comprises one or more antioxidant additives. Examples of useful antioxidants are phenolic compounds, aromatic amine derivatives, and organo tin compounds. Preferred antioxidant additives include 2,6-di-tert-butyl-4-methylphenol, para-methoxyphenol, N-n-butyl-para-aminophenol, N,N'-diphenyl-p-phenylenediamine, N,N'-dimethyl-para-phenylenediamine, N-phenyl-β-methylamine, phenothiazine, tin(II)octanoate and tin(II)acetate.

The three component mold release compositions of this invention are suitable for a wide variety of general polymer processing methods or molding techniques. The amount of mold-release composition employed generally will depend upon the particular use for which the mold release composition is employed and the particular polymers or rubber employed. The mold release compositions should be added separately to a cold mold. In the process of lubricating a metal mold the three component release agent of this invention is applied to the mold surface as a molten liquid, optionally in an admixture with an inert, volatile diluent or carrier. If a diluent is employed, said release agent is dissolved or dispersed in said inert, volatile liquid diluent or carrier in the use of the mold release compositions. Generally the concentration of the composition of this invention in the carrier is not narrowly critical and can vary widely depending on the intended use. The amount of solvent or carrier will govern the viscosity of the film. The concentration of the inert carrier will vary from about 0.1 percent to about 90 weight percent, preferably about 15 to about 85 percent by weight. The mold release compositions are readily prepared by mixing the compositions of this invention with the carrier by, for example, stirring.

Example 1 demonstrates the method for preparing the first component, labeled a poloxyalkylene intermediate. In the method of this invention the first component comprising the water soluble copolymer is blended with the second component, the crystalline polyoxyalkylene glycol prior to any use with an antioxidant as a mold releasing agent. It is noted that some combinations exhibit reduced high temperature viscosity. Example 10 demonstrates how increasing stiffness of the mold release agent can be achieved by the crystalline component.

The invention will be further illustrated by the following specific examples. It should be understood the examples are only given in the way of illustration and are not intended to limit the invention in any way.

EXAMPLE 1 (6742-44)

Preparation of an 800 Molecular Weight Polyoxyalkylene Intermediate

To a clean and dried kettle were charged 5.0 lb diethylene glycol, and 110 grams of 45% aqueous potassium hydroxide. The contents of the kettle were heated to 70° C. The kettle temperature was raised to 100° C. by the exothermic reaction after the addition of a mixture of 0.2 lb ethylene oxide and propylene oxide, 50/50 by weight. The addition of the ethylene oxide/propylene oxide mixture was continued while controlling the reaction temperature at 115° to 120° C. and reaction pressure at 50 psi until a total of 40.0 lb of the mixture was reacted. The number average molecular weight of the product was 787 according to the terminal group analysis.

EXAMPLE 2 (6742-49)

Preparation of Polyoxyalkylene Blending Stock A

A polyoxyalkylene blending stock was prepared by reacting 8.0 lb of the intermediate prepared in Example 1 and 32.0 lb of a mixture of ethylene oxide and propylene oxide, 50/50 by weight at 115° C. and 50 psi pressure. The product was neutralized with 280 grams of Magnesol® and filtered. The viscosity of the product was 472 cs measure at 100° F.

Magnesol® is the trademark for a synthetic adsorptive magnesium silicate, produced by FMC corporation.

EXAMPLE 3 (6742-53)

Preparation of Polyoxyalkylene Blending Stock B

By a procedure similar to Example 2, a polyoxyalkylene blending stock was prepared from the 7.0 lb of intermediate prepared in Example 1 and 32.0 lb of a mixture of ethylene oxide and propylene oxide, 50/50 by weight. The viscosity of the product was 537 cs measured at 100° F.

EXAMPLE 4 (6742-79)

Preparation of Polyoxyalkylene Blending Stock C

By a procedure similar to Example 2, a polyoxyalkylene blending stock was prepared, from 2.8 lb of the intermediate prepared in Example 1 and 3.5 lb of a mixture of ethylene oxide and propylene oxide, 50/50 by weight. The viscosity of the product was 163 cs measured at 100° F.

EXAMPLE 5 (6742-52)

Preparation of a Polyoxyalkylene Blending Stock D

By a procedure similar to Example 2, a polyoxyalkylene blending stock was prepared from 5.5 lb of the intermediate prepared in Example 1 and 33.0 lb of a mixture of ethylene oxide and propylene oxide, 50/50 by weight. The viscosity of the product was 703 cs measured at 100° F.

EXAMPLE 6 (6742-68)

Preparation of a polyoxyalkylene Blending Stock E

By a procedure similar to Example 2, a polyoxyalkylene blending stock was prepared from 4.0 lb of the intermediate prepared in Example 1 and 29.75 lb of a mixture of ethylene oxide and propylene oxide, 50/50 by weight. The viscosity of the product was 1122 cs measured at 100° F.

EXAMPLE 7 (6742-84)

Preparation of Polyoxyethylene Blending Stock F

A polyoxyethylene blending stock, number average molecular weight 1000, was prepared in a small kettle by reacting 8.0 lb diethylene glycol, 40 grams aqueous solution of potassium hydroxide, 45% by weight and 70.0 lb ethylene oxide at 110° C. and 50 psi. The resulting product was treated with an aqueous slurry of Magnesol®, 150 grams in 150 ml of water, stripped to dryness

EXAMPLE 8 (6742-65)

Preparation of Polyoxyethylene Blending Stock G

By a procedure similar to Example 7, a polyoxyethylene blending stock, number average molecular 900, was prepared from 4.5 lb diethylene glycol, and 32.5 lb ethylene oxide. The number average molecular weight was established according to terminal group analysis.

EXAMPLE 9

Mold Release Formulation

Four mold release formulas were prepared from polyoxyalkylene blending stock A, F and G. Results are summarized below:

| Composition, % | | | Viscosity, cs | | | Melting Point |
|---|---|---|---|---|---|---|
| A | F | G | 100° F. | 150° F. | 210° F. | ° C. |
| 9-a 100 | — | — | 472 | 164 | 62 | <10 |
| 9-b 80 | 20 | — | 364 | 136 | 58 | 36 |
| 9-c 70 | 30 | — | 323 | 120 | 52 | 37 |
| 9-d 70 | — | 30 | 321 | 119 | 51 | 34 |

This example demonstrates that the use of the crystalline component blending stocks F and G reduces the high temperature viscosity. These blends solidify to a desired paste like consistency when cooled to ambient temperature.

EXAMPLE 10

Mold Release Formulation

Mold release formulas were prepared from blending stocks B, F and G. Results are summarized below:

| Composition, % | | | Viscosity, cs | | | Melting Point |
|---|---|---|---|---|---|---|
| B | F | G | 100° F. | 150° F. | 210° F. | ° C. |
| 10-a 100 | — | — | 537 | 200 | 69 | <0 |
| 10-b 80 | 20 | — | 411 | 153 | 67 | 37 |
| 10-c 70 | 30 | — | 323 | 120 | 52 | 37 |
| 10-d 60 | 40 | — | 322 | 127 | 50 | 37 |
| 10-e 70 | — | 30 | 357 | 133 | 57 | 34 |
| 10-f 60 | — | 40 | 327 | 127 | 50 | 34 |

These formulas shows that the increasing stiffness of the mold release can be achieved by increasing the crystalline component in the formula.

EXAMPLE 11

Mold Release Formulation

Mold release formulas were prepared from blending stocks B, F and G. Results are summarized below:

| Composition, % | | | Viscosity, cs | | | Melting Point |
|---|---|---|---|---|---|---|
| D | F | G | 100° F. | 150° F. | 210° F. | ° C. |
| 11-a 100 | — | — | 703 | 257 | 113 | <0 |
| 11-b 65 | 35 | — | 426 | 150 | 61 | 37 |
| 11-c 65 | — | 35 | 415 | 150 | 61 | 34 |

EXAMPLE 12

Mold Release Formulation

Mold release formulas were prepared from blending stocks C, E, F and G. Results are summarized below:

| Composition, % | | | | Viscosity, cs | | | Melting Point |
|---|---|---|---|---|---|---|---|
| C | E | F | G | 100° F. | 150° F. | 210° F. | ° C. |
| 12-a 25 | 75 | — | — | 716 | 263 | 106 | <0 |
| 12-b 16.3 | 48.7 | 35 | — | 413 | 150 | 64 | 37 |
| 12-c 16.3 | 48.7 | — | 35 | 413 | 150 | 60 | 34 |

EXAMPLE 13

Mold Release Formulation

To a homogeneous mixture of blending stock C, 16.3%, blending stock E, 48.7%, blending stock F, 35% heated at 60° C. was added an effective amount of antioxidant additives sufficient to result in an inhibited mandrel release agent. This mold release is evaluated as mandrel release agent in a rubber hose forming process. The rubber hose was readily released from the mandrel. The residue release agent remained as a thin film on the hose without dripping or flaking until removed by washing with water.

What is claimed is:

1. A composition useful as a mold release agent comprising:
   (a) 80% to 60% by weight one or more water soluble copolymers of ethylene oxide and propylene oxide containing at least 40% and less than 80% by weight oxyethylene units and exhibiting liquid phase at ambient temperatures;
   (b) 20% to 40% by weight of a crystalline polyoxyethylene glycol having a melting point slightly above ambient; and
   (c) 100 to 5000 ppm of one or more antioxidant additives.

2. The composition of claim 1 wherein the viscosity of the liquid polymer component is from 400 to 1250 cs, measured at 100° F.

3. The composition of claim 2 wherein the viscosity can be controlled by adjusting the molecular weight of the polymer or by blending two or more polymers.

4. The composition of claim 1 wherein the water soluble copolymer is a n-butanol initiated mixed copolymer consisting of about 50% by weight oxyethylene and 50% by weight oxypropylene.

5. The composition of claim 1 wherein the water soluble copolymer is a diethylene glycol initiated mixed copolymer consisting of approximately 50% by weight oxyethylene and 50% oxypropylene.

6. The composition of claim 1 wherein the crystalline polyoxyalkylene compound comprises a mono- or di-functional initiator derived polyethylene oxide having at least 23 units in the block of oxyethylene segments.

7. The composition of claim 6 wherein the polyoxyalkylene compound is selected from the group consisting of polyethylene glycols having an approximate molecular weight between 800 and 1200.

8. The composition of claim 1 wherein one or more antioxidant additives are selected from the group consisting of phenolic compounds, aromatic amine derivatives and organic tin compounds.

9. The composition of claim 8 wherein one or more antioxidant additives are selected from the group consisting of 2,6-di-tert-butyl-4-methylphenol, para-methoxyphenol, N-n-butyl-paraaminophenol, N,N'-diphenyl-p-phenylenediamine, N,N'-dimethyl-para-phenylenediamine, N-phenyl-β-methylamine, phenothiazine, tin(II)octanoate and tin(II)acetate.

10. A composition useful as a mold release agent comprising:
- (a) 80% to 60% by weight of one or more water soluble copolymers exhibiting liquid phase at ambient temperatures, wherein the copolymers are made by reacting diethylene glycol with a mixture of ethylene oxide and propylene oxide, wherein the mixture initially contains about 50% ethylene oxide and about 50% propylene oxide;
- (b) 20% to 40% by weight of a crystalline polyoxyethylene glycol having a melting point slightly above ambient.

11. A composition useful as a mold release agent comprising:
- (a) 80% to 60% by weight one or more water soluble copolymers of ethylene oxide and propylene oxide containing at least 40% and less than 80% by weight oxyethylene units and exhibiting liquid phase at ambient temperatures;
- (b) 20% to 40% by weight of a crystalline polyoxyethylene glycol having a melting point slightly above ambient; and
- (c) 100 to 5000 ppm of one or more antioxidant additives;

wherein the composition has a melting point that is the same as or slightly less than the melting point of the crystalline polyoxyethylene glycol.

* * * * *